Sept. 6, 1955   H. P. HANSEN   2,716,903
STEERING FACILITIES OF AN AUTOMOBILE
Original Filed Nov. 22, 1948
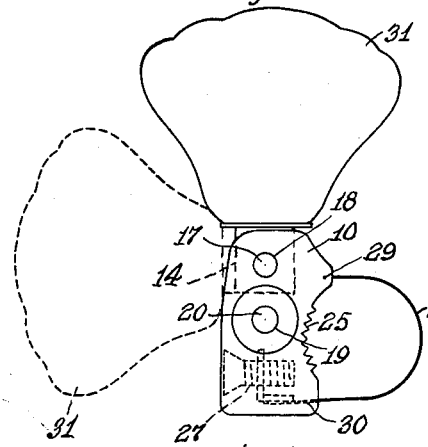
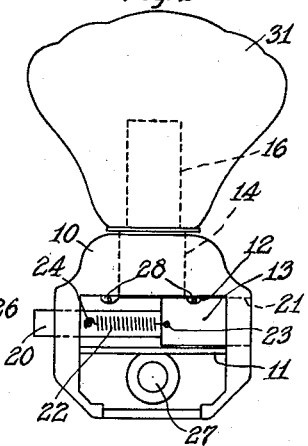
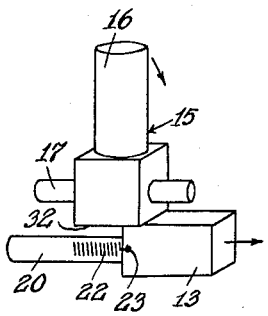
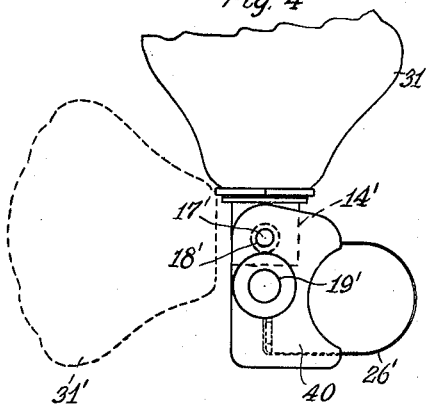
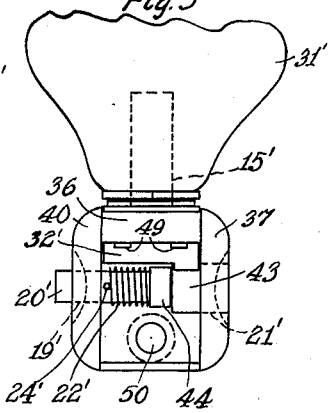
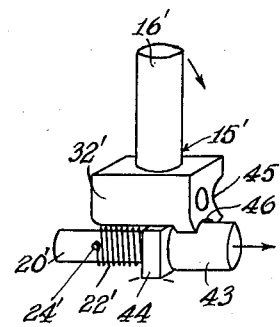
Hans P. Hansen INVENTOR.
BY *Peter U. Boesen*
ATTORNEY.

United States Patent Office 2,716,903
Patented Sept. 6, 1955

2,716,903
STEERING FACILITIES OF AN AUTOMOBILE

Hans Peter Hansen, Dunellen, N. J.

Substituted for application Serial No. 61,500, November 22, 1948. This application July 12, 1954, Serial No. 442,504

5 Claims. (Cl. 74—557)

This is a substitute for application, Ser. No. 61,500 forfeited for non-payment of final fee.

This invention relates to new and useful improvements in steering facilities of an automobile, and it has more particularly for its object to provide means associated with the steering wheel of a car, whereby safer and more comfortable driving may be accomplished; and it will also be especially useful in backing up a car, or placing the same in position along the curb.

My device, as shown herein, will, in addition, eliminate the possibility, as compared with other steering knobs, of catching the sleeve of the driver of the car, when operating the steering wheel with my device thereon, as the said device, if desired, may be put into inoperative or inactive position, due to the special construction of the same.

The device, as illustrated herein, is of a sturdy construction, which will make it durable and fully dependable in operation.

It will appear that, if desired, the steering knob may be operated with or without the locking mechanism shown herein.

In the drawing, wherein similar references indicate corresponding parts:

Figure 1 is a side elevational view of my device.

Figure 2 is a rear elevational view of same, showing the part facing and attached to a steering wheel of an automobile.

Figure 3 is a side elevational view of the mechanism proper, with the casing and steering knob removed.

Figure 4 is a side elevational view showing a slight modification of my device.

Figure 5 is a rear elevational view of the device shown in Figure 4; while

Figure 6 is a side elevational view of the mechanism proper, with the casing and steering knob, shown in Figure 4, removed.

Referring more particularly to the drawing, the numeral 10 indicates a solid member, or housing, open on one side, as may be seen in Figure 2, wherein the mechanism mounted in said housing is in the main shown through said opening.

A portion 11 is integrally and centrally mounted in said housing 10, and serves, together with the roof 12 of the housing, as a support and guide for a slidable square faced block member 13.

The housing 10 is at the top formed with a cut-out 14, which cut-out extends to the rear of the housing, as shown in dotted lines in Figure 1. In said cut-out 14 is mounted a handle 15, the latter consists of a cylindrical top portion 16 and a rectangular solid block member 32.

The handle 15 is pivotally mounted on a bolt 17, extending through the housing 10, by means of holes 18, as shown in Figure 1.

The housing 10 is upon each side thereof made with an opening, which openings are in alignment with each other, one of said openings 19 is round and adapted to accommodate a slidable plunger 20, which is integral with the block member 13; the latter is, as described before, adapted in operation to slide between the partition 11 and the roof 12 and is in such operation accommodated by the other and square opening 21 in the other side of the housing. An extension spring 22 has one end fastened to the block member 13 by means of a small aperture 23 in the latter, and the other end secured by a stud 24 upon the inside of the side wall of the housing.

The edges of the walls at the open side of the housing are corrugated, as shown at 25, in order to secure a solid attachment of said housing to a steering wheel, as a band 26, fastened in any convenient manner, such as by being cast into the base, or by screws 27 and 28 to the housing, completes such attachment; the said band is arranged with the respective ends within the top 29 and bottom 30 of the open side of the housing.

A knob 31 is mounted upon the top portion 16 of the handle 15.

The knob 31 is shown in upright position in Figure 2, that is in operative position, in which the square lower face of the block member 32 rests against a part of the square upper face of the block member 13.

When it is desired to fold the said knob 31, a pressure is made by a finger against the plunger 20, whereby the block member 13 is pushed forward through the opening 21 and slightly beyond the side wall of the housing, just enough to clear any contact with the block member 32, as the square upper face of the block member 13 will then engage an adjoining square face of the block member 32, which has been turned 90 degrees, thus permitting the handle 15 with the knob 31 to fold.

By again pushing the plunger 20 formed so that the block member 13 clears the engagement with the block member 32, the handle 15 may be swung back into upright position, and by next releasing the pressure on the plunger 20, the spring 22 will contract and simultaneously bring the block member 13 back into engagement with the square lower face of the block member 32, as first mentioned, when the handle 15 with the knob 31 is in upright position.

By a repeated pressure on the plunger 20 in the manner thus described, the handle 15 with the knob 31 may be changed alternately into an upright or folded position.

In the modification shown in Figures 4, 5 and 6, the numeral 40 indicates a housing, which, as before described, is open on one side, as may be seen in Figure 5, and wherein the mechanism mounted in said housing is in the main shown through said opening.

The housing 40 is at its top formed with a cut-out 14', which cut-out extends to the rear of the housing, as shown in dotted lines in Figure 4. In the said cut-out 14' is mounted a handle 15'; the latter consists of a cylindrical top portion 16' and a solid block member 32' integral therewith, as shown especially in Figure 6.

The handle 15' is pivotally mounted on a bolt 17' extending through the housing 40 by means of holes 18', as shown in Figure 4.

The housing 40 is upon each side thereof made with openings 19' and 21' in alignment with each other.

A plunger 20' is slidable in the opening 19'; said plunger is upon one end thereof formed with an enlargement 43 adapted to slide through the other opening 21'. A bracket 44, integrally formed upon the inner side of the housing 40, regulates the back and forward movement of the plunger 20'; said plunger is provided with a compression spring 22' having one end thereof secured to a pin 24' on the plunger 20', and the other end resting against the bracket 44.

The block member 32' is at one end provided with curved portions 45 and 46, respectively, arranged at a 90 degree angle to each other.

Upon pushing the plunger 20' forward, simultaneously compressing the spring 22', the enlarged portion 43 of the plunger 29' will move outward, or to the right, whereby the handle 15' may be turned and the knob 31' folded, as upon a retracting movement of the plunger 20' the enlarged portion 43 upon the latter will now be made to engage the curvature 45. By a similar movement of the plunger the handle may again be turned and the enlarged portion 43 again be made to engage the curvature 46 in the block member 32', whereby the handle 15' and knob 31' will again be in an upright position.

A band, as shown at 26' in Figure 4, may be secured to the housing 40 in any convenient manner, such as by casting, or by screws 49 and 50, for attaching the device to a steering wheel.

What I claim as new, and desire to secure by Letters Patent of the United States, is:

1. In a device of the class described, a housing formed with a cut-away portion at the top thereof, a handle pivotally mounted in said cut-away portion, a knob at one end of said handle, and a square-faced block member integral with the other end of the latter, a shank transversely and slidably mounted in the housing, a square-faced block member at one end of said shank adapted to cooperate with the square-faced block member of the handle, whereby to arrest the latter in a vertical or horizontal position.

2. In a device of the class described, a housing formed with a cut-away portion at the top thereof, a handle pivotally mounted in said cut-away portion, a knob at one end of said handle, and a square-faced block member integral with the other end of the latter, said housing being in one side formed with an opening, and in alignment with the latter in the opposite side with a square opening, a shank transversely and slidably mounted in the housing and through said openings, said shank being at one end formed with a square-faced block member adapted to engage and cooperate with the square-faced block member of the handle, the square-faced block member of the shank being adapted to move through the square opening in the side wall and beyond the latter in permitting the handle to move from a vertical to a horizontal position, and an extension spring actuating said shank in its movement forth and back.

3. A steering knob for automobile steering wheels, comprising a housing, the latter being formed with cut-outs at the top and side thereof, a handle pivotally mounted in the cut-out at the top of said housing, a knob arranged at one end of said handle, and a square-sided block member integral with the other end of the latter, a shank slidable transversely through the cut-outs in the side of said housing, an enlargement formed at one end of said shank and integral therewith, said enlargement being adapted to engage one side of said block member, when the handle is in an upright position and an adjoining side of said block member when the handle is in a horizontal position, substantially as and for the purpose set forth.

4. In a device, as claimed in claim 2, and wherein a band is secured to the housing, whereby to attach the latter to a steering wheel.

5. In a device, as claimed in claim 2, and wherein the edges of the walls of the housing are corrugated, whereby to secure a solid attachment of said housing to a steering wheel.

References Cited in the file of this patent

UNITED STATES PATENTS

| | | |
|---|---|---|
| 2,101,519 | Thorp | Dec. 7, 1937 |
| 2,346,615 | Santon | Apr. 11, 1944 |
| 2,592,413 | Garfield | Apr. 8, 1952 |